(12) United States Patent
Fu et al.

(10) Patent No.: US 10,673,318 B2
(45) Date of Patent: *Jun. 2, 2020

(54) CONVERTER APPARATUS AND METHOD WITH AUXILIARY TRANSISTOR FOR PROTECTING COMPONENTS AT STARTUP

(71) Applicant: Futurewei Technologies, Inc., Plano, TX (US)

(72) Inventors: Dianbo Fu, Frisco, TX (US); Fei Ye, Shanghai (CN); Lei Shi, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,983

(22) Filed: Feb. 4, 2019

(65) Prior Publication Data

US 2019/0173374 A1    Jun. 6, 2019

Related U.S. Application Data

(63) Continuation of application No. 15/498,163, filed on Apr. 26, 2017, now Pat. No. 10,199,924.

(51) Int. Cl.
*H02M 1/32* (2007.01)
*H02M 1/36* (2007.01)
(Continued)

(52) U.S. Cl.
CPC .............. *H02M 1/32* (2013.01); *H02M 1/36* (2013.01); *H02M 3/158* (2013.01); *H02M 7/44* (2013.01)

(58) Field of Classification Search
CPC ............ H02M 1/32; H02M 1/34; H02M 1/36; H02M 3/07; H02M 7/44; H02M 2001/007; H02M 2003/072
See application file for complete search history.

(56) References Cited

U.S. PATENT DOCUMENTS 4,167,776 A * 9/1979 Nygaard ................. H02M 1/34
                                                        363/132
5,684,688 A * 11/1997 Rouaud ................... H02M 1/34
                                                        363/132
(Continued)

FOREIGN PATENT DOCUMENTS

| CN | 104993786 A | 10/2015 |
| CN | 105207476 A | 12/2015 |
| CN | 105656310 A | 6/2016 |

*Primary Examiner* — Yusef A Ahmed
(74) *Attorney, Agent, or Firm* — Slater Matsil, LLP

(57) ABSTRACT

In certain embodiments, an apparatus includes an inductor having first and second terminals. The first terminal is configured to be coupled to a power source. The apparatus includes a pair of serially-coupled transistors coupled to the second terminal of the inductor. A transistor intermediate node is positioned between the pair of serially-coupled transistors. The apparatus includes a pair of serially-coupled diodes coupled to the second terminal of the inductor. A diode intermediate node is positioned between the pair of serially-coupled diodes. The apparatus includes a first capacitor coupled in parallel with the serially-coupled transistors and the serially-coupled diodes. The apparatus includes a sub-circuit having a second capacitor serially-coupled with an auxiliary transistor. The sub-circuit is coupled between the transistor intermediate node and the diode intermediate node and is in parallel with a transistor of the pair of serially coupled transistors and with a diode of the pair of serially-coupled diodes.

17 Claims, 9 Drawing Sheets

(51) Int. Cl.
*H02M 3/158* (2006.01)
*H02M 7/44* (2006.01)

(56) References Cited

U.S. PATENT DOCUMENTS

| | | | | |
|---|---|---|---|---|
| 5,689,178 A * | 11/1997 | Otake | ............... | H02M 3/1563 |
| | | | | 323/282 |
| 6,226,192 B1 * | 5/2001 | Yamanaka | ............ | H02M 1/34 |
| | | | | 363/56.01 |
| 7,292,462 B2 * | 11/2007 | Watanabe | ............ | H02M 3/07 |
| | | | | 307/110 |
| 7,944,188 B1 * | 5/2011 | Wittenbreder, Jr. | ......................... | |
| | | | | H02M 1/4208 |
| | | | | 323/222 |
| 9,419,522 B1 * | 8/2016 | Khaligh | ............ | H02M 3/1582 |
| 9,608,512 B2 * | 3/2017 | Zhak | ............ | H02M 1/36 |
| 9,653,986 B2 * | 5/2017 | Zhak | ............ | H02M 1/36 |
| 2003/0214462 A1 * | 11/2003 | Roh | ............ | G09G 3/2965 |
| | | | | 345/60 |
| 2004/0051509 A1 * | 3/2004 | Matsuo | ............ | G05F 1/56 |
| | | | | 323/282 |
| 2006/0115242 A1 * | 6/2006 | Kameda | ............ | H02M 1/32 |
| | | | | 388/803 |
| 2009/0115392 A1 * | 5/2009 | Shimizu | ............ | H02M 3/156 |
| | | | | 323/283 |
| 2012/0218785 A1 * | 8/2012 | Li | ............ | H02M 1/34 |
| | | | | 363/21.12 |
| 2012/0287690 A1 * | 11/2012 | Paatero | ............ | H02M 7/487 |
| | | | | 363/134 |
| 2012/0320643 A1 * | 12/2012 | Yang | ............ | H02M 1/34 |
| | | | | 363/56.01 |
| 2013/0002215 A1 * | 1/2013 | Ikeda | ............ | H02M 3/158 |
| | | | | 323/271 |
| 2013/0021011 A1 * | 1/2013 | Okuda | ............ | H02M 3/158 |
| | | | | 323/282 |
| 2013/0107599 A1 * | 5/2013 | Shekhawat | ............ | H02M 7/487 |
| | | | | 363/131 |
| 2013/0119961 A1 * | 5/2013 | Okuda | ............ | H02M 3/158 |
| | | | | 323/299 |
| 2013/0235626 A1 * | 9/2013 | Jang | ............ | H02M 1/4216 |
| | | | | 363/37 |
| 2014/0001856 A1 * | 1/2014 | Agamy | ............ | H02M 3/155 |
| | | | | 307/43 |
| 2014/0198536 A1 | 7/2014 | Fu et al. | | |
| 2014/0266135 A1 | 9/2014 | Zhak et al. | | |
| 2016/0126833 A1 * | 5/2016 | Yatsu | ............ | H02M 3/07 |
| | | | | 323/312 |
| 2016/0197562 A1 * | 7/2016 | Kondo | ............ | H02M 7/2176 |
| | | | | 363/126 |
| 2016/0285371 A1 * | 9/2016 | Fu | ............ | H02M 3/158 |
| 2016/0329810 A1 | 11/2016 | Lee et al. | | |
| 2017/0019027 A1 * | 1/2017 | Knobloch | ............ | H02M 1/44 |

* cited by examiner

CONVERTER APPARATUS AND METHOD WITH AUXILIARY TRANSISTOR FOR PROTECTING COMPONENTS AT STARTUP

CROSS-REFERENCE TO RELATED APPLICATIONS

This application is a continuation of U.S. patent application Ser. No. 15/498,163 filed on Apr. 26, 2017, which is incorporated herein by reference.

TECHNICAL FIELD

The present disclosure relates to circuits, and more particularly to converter circuits.

BACKGROUND

Converters are circuits that convert one voltage at an input to another voltage at an output. Typically, converters are adapted for receiving voltage from a power source with a certain polarity configuration. However, if such polarity configuration is improperly applied (e.g. flipped, etc.) at start up, active components (e.g. transistors, diodes, etc.) of the converter may be at risk of undue voltage stress which may result in damage or even inoperability.

SUMMARY

Provided is an apparatus including a converter circuit. The converter circuit comprises an inductor including a first terminal configured to be coupled to a power source, and a second terminal. Also included is a pair of serially-coupled transistors coupled to the second terminal of the inductor. The pair of serially-coupled transistors have a transistor intermediate node therebetween. Further included is a pair of serially-coupled diodes coupled to the second terminal of the inductor. The pair of serially-coupled diodes have a diode intermediate node therebetween. A first capacitor is coupled in parallel with the serially-coupled transistors and the serially-coupled diodes. Further, the converter circuit includes a sub-circuit having a second capacitor serially-coupled with an auxiliary transistor. The sub-circuit is coupled between the transistor intermediate node and the diode intermediate node.

Also provided is a method for operating a converter circuit set forth above in the aforementioned apparatus embodiment. In use, the converter circuit is started up, and, in connection with the startup, the auxiliary transistor is activated for reducing a voltage stress on at least a portion of the converter circuit in an event that the power source is improperly coupled.

Optionally, in any of the preceding embodiments, the converter circuit may be configured for activating the auxiliary transistor at start up for reducing a voltage stress on at least a portion of the converter circuit in an event that the power source is improperly coupled.

Optionally, in any of the preceding embodiments, the auxiliary transistor may reduce the voltage stress on at least one of the pair of serially-coupled transistors. As an additional option, the auxiliary transistor may reduce the voltage stress on at least one of the pair of serially-coupled diodes.

Optionally, in any of the preceding embodiments, the first capacitor may be configured for storing a voltage amount that is less than or equal to half of an output voltage of the converter circuit.

Optionally, in any of the preceding embodiments, the first capacitor may be configured for reducing a voltage stress on at least a portion of the converter circuit Optionally, in any of the preceding embodiments, the auxiliary transistor may be of a same type as the pair of serially-coupled transistors.

Optionally, in any of the preceding embodiments, the auxiliary transistor may be of a different type as compared to the pair of serially-coupled transistors.

Optionally, in any of the preceding embodiments, the sub-circuit may further include a third capacitor coupled in parallel with the auxiliary transistor.

Optionally, in any of the preceding embodiments, the sub-circuit may further include a resistor coupled in parallel with the auxiliary transistor.

Optionally, in any of the preceding embodiments, the auxiliary transistor may be an insulated-gate bipolar transistor (IGBT).

Optionally, in any of the preceding embodiments, the auxiliary transistor may be a metal oxide semiconductor field effect transistor (MOSFET).

BRIEF DESCRIPTION OF THE DRAWINGS

FIG. 1C-2 illustrates a second sub-circuit for reducing a voltage stress on at least a portion of a converter circuit in an event that a power source is improperly coupled, in accordance with an embodiment.

FIG. 2 illustrates a converter circuit equipped with an auxiliary transistor for protecting at least a portion of the converter circuit at start up, in accordance with another embodiment.

DETAILED DESCRIPTION OF ILLUSTRATIVE EMBODIMENTS

Various embodiments are described herein for providing a converter circuit that incorporates an auxiliary transistor that is configured for protecting at least a portion of the converter circuit at start-up. Specifically, in one possible embodiment, such protection may be provided when a power source is improperly applied to the converter circuit.

This may occur, for example, when a polarity of the power source is switched. In such case, the auxiliary transistor serves for reducing a voltage stress on at least a portion of the converter circuit which, in turn, reduces a chance that one or more components of the converter circuit is damaged and the converter circuit rendered impaired or inoperable.

Figure 1A:
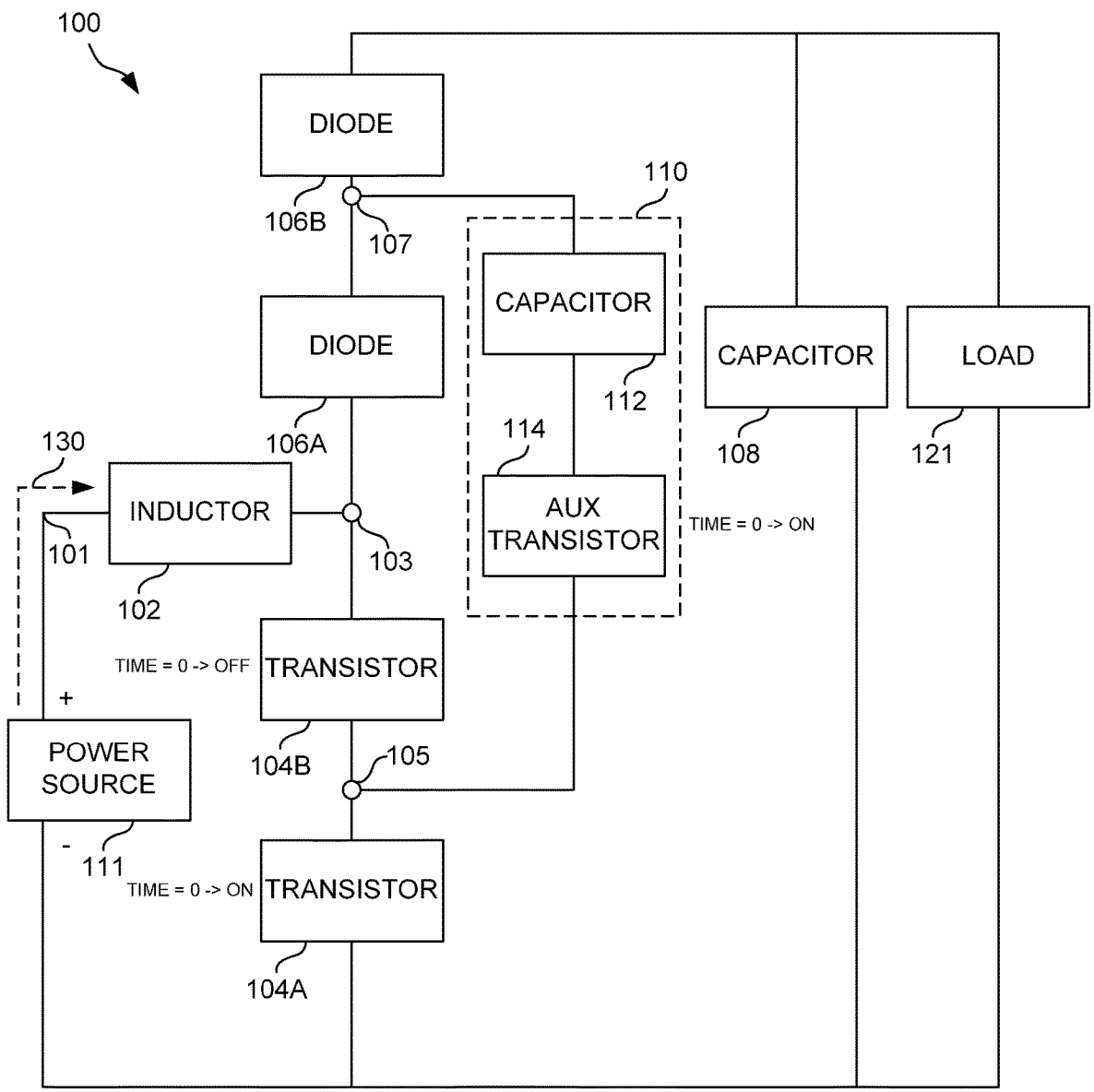
FIG. 1A illustrates a converter circuit with a power source coupled correctly thereto, in accordance with an embodiment.
Figure 1B:
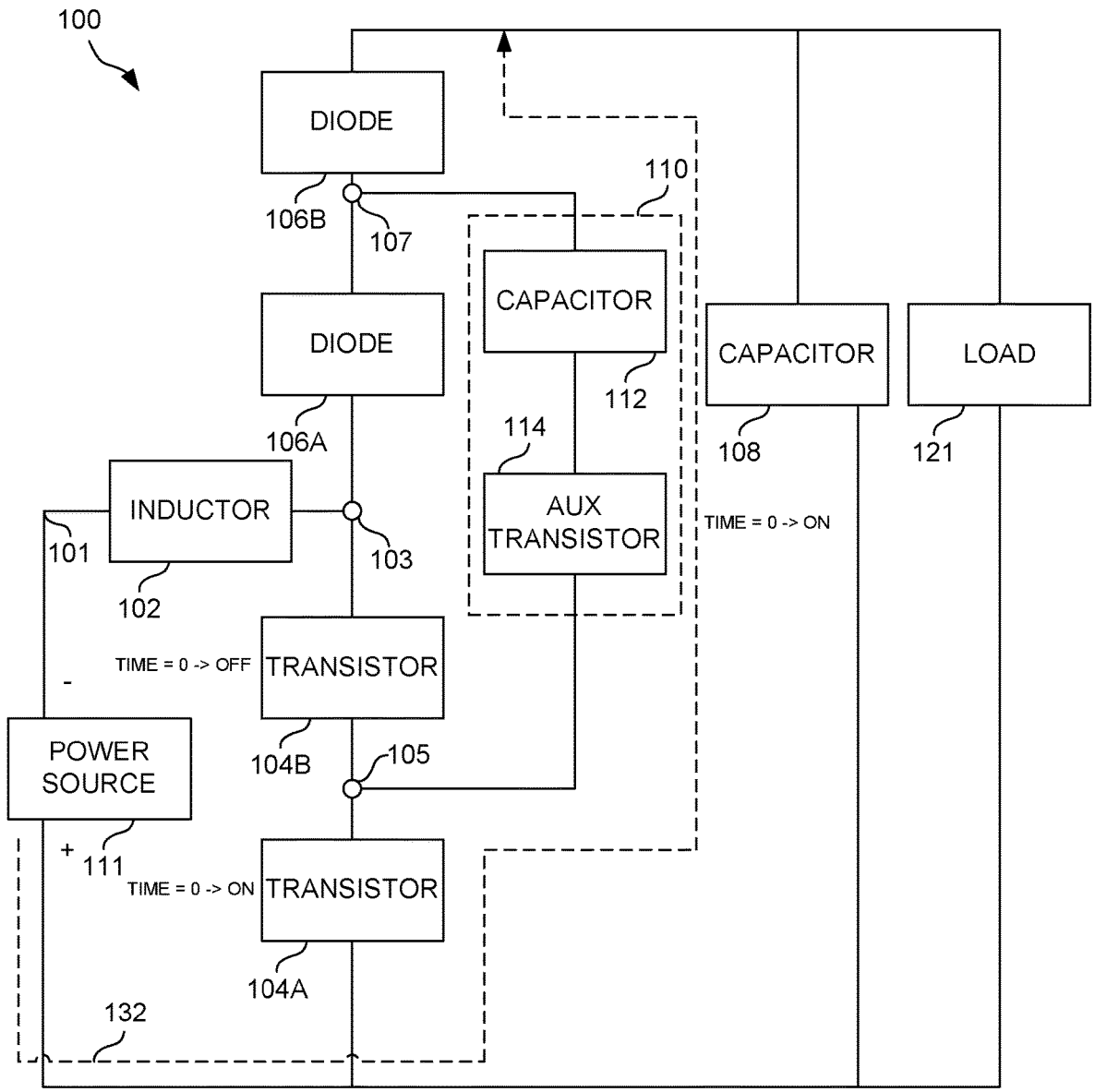
FIG. 1B illustrates the converter circuit of FIG. 1A with the power source coupled incorrectly thereto, in accordance with an embodiment.

FIGS. 1A and 1B both illustrate a converter circuit 100 equipped with an auxiliary transistor 114 for protecting at least a portion of the converter 100 at start up, in accordance with an embodiment. Specifically, FIG. 1A illustrates the converter circuit 100 with a power source 111 coupled correctly thereto, in accordance with an embodiment. Further, FIG. 1B illustrates the converter circuit 100 with the power source 111 coupled incorrectly thereto (e.g. the polarity is flipped), in accordance with an embodiment.

In one possible embodiment, the converter circuit 100 may include a direct current (DC)-DC converter for converting a source of direct current (DC) from one voltage level to another, and may even take the form of a multi-level boost converter. Further, while the present and other embodiments illustrate a plurality of discrete components coupled together, it should be noted that any one or more of the components may be integrated with any other, as desired. Further, the term "coupled" in the context of the present description may refer to any direct and/or indirect electrical coupling with relevant electric components therebetween. In other words, such electric components may be coupled with or without intermediate components therebetween.

As shown, the converter circuit 100 includes an inductor 102 including a first terminal 101 configured to be coupled to the power source 111, and a second terminal 103. In the context of the present description, the inductor 102 may include any inductive element that exhibits inductance. Further, the power source 111 may include any source of power. For example, in the context of an embodiment where the converter circuit 100 takes the form of a DC-DC converter, the power source 111 may include a DC power source. In such embodiment, the power source 111 may include a photovoltaic cell (e.g. solar panel, etc.), a DC battery, etc.

With continuing reference to FIGS. 1A-1B, the converter circuit 100 further includes a pair of serially-coupled transistors (including a first transistor 104A and a second transistor 104B) coupled to the second terminal 103 of the inductor 102. As shown, the pair of serially-coupled transistors 104A, 104B have a transistor intermediate node 105 therebetween. In various embodiments, the serially-coupled transistors 104A, 104B (and any other transistor disclosed herein) may include any type of transistor [e.g. insulated-gate bipolar transistors (IGBTs), metal oxide semiconductor field effect transistors (MOSFETs), etc.].

As shown, during use at start up (T=0), the first transistor 104A is activated (i.e. on) and the second transistor 104B is deactivated (i.e. off). To this end, a current 130 flows as shown in FIG. 1A at start up. Subsequently, the serially-coupled transistors 104A, 104B are switched on and off in an alternating manner. More information regarding the operation of the converter circuit 100 and the various components thereof will be elaborated upon during the description of subsequent embodiments.

Further provided is a pair of serially-coupled diodes (including a first diode 106A and a second diode 106B) coupled to the second terminal 103 of the inductor 102. The pair of serially-coupled diodes 106A, 106B have a diode intermediate node 107 therebetween. Still yet, a first capacitor 108 is coupled in parallel with the serially-coupled transistors 104A, 104B and the serially-coupled diodes 106A, 106B, as well as a load 121. In the context of the present description, the first capacitor 108 (and any other capacitor disclosed herein) may include any capacitive element that exhibits capacitance. Further, in a possible embodiment where the power source 111 includes a photovoltaic cell (e.g. solar panel, etc.), the load 121 may include an inverter or any other subsequent componentry necessary for processing energy collected via the photovoltaic cell.

The converter circuit 100 further includes a sub-circuit no having a second capacitor 112 that is serially-coupled with an auxiliary transistor 114. As shown, the sub-circuit no is coupled between the transistor intermediate node 105 and the diode intermediate node 107. In various embodiments, the auxiliary transistor 114 may be of a same or different type (IGBT vs. MOSFET) as compared with the pair of serially-coupled transistors 104A, 104B.

As mentioned earlier, the auxiliary transistor 114 is configured for protecting at least a portion of the converter circuit 100 at start-up when the power source 111 is improperly applied to the converter circuit 100 by a polarity of the power source 111 being switched (i.e. flipped). This may occur, for example, by a photovoltaic panel (not shown) being incorrectly attached to the converter circuit 100 during installation.

As shown in FIG. 1B, at start up, the current 132 flows in an opposite direction when the power source 111 is improperly applied to the converter circuit 100. In such case, the current 132 flows through the first transistor 104A (since it is on at startup), the auxiliary transistor 114 (since it is on at start up), the first capacitor 112 (which has no or substantially no voltage stored at start up), and the second diode 106B. Without the auxiliary transistor 114, the first transistor 104A (since it is on at startup) and the second diode 106B would otherwise bear the entire voltage applied by the improperly applied power source 111 and a likelihood of damage and/or subsequent inoperability would be increased.

However, with the auxiliary transistor 114 coupled as shown and operating as set forth above, such auxiliary transistor 114 bears at least a portion of the aforementioned voltage, so that the first transistor 104A and second diode 106B experience less voltage stress. To this end, the auxiliary transistor 114 serves for reducing a voltage stress on at least a portion of the converter circuit 100 (at least the first transistor 104A and second diode 106B). This, in turn, reduces a chance that such portion of the converter circuit 100 is damaged and rendered impaired or inoperable.

More illustrative information will now be set forth regarding various optional architectures and uses in which the foregoing method may or may not be implemented, per the desires of the user. It should be noted that the following information is set forth for illustrative purposes and should not be construed as limiting in any manner. Any of the following features may be optionally incorporated with or without the other features described.

Figures 1, 1C:
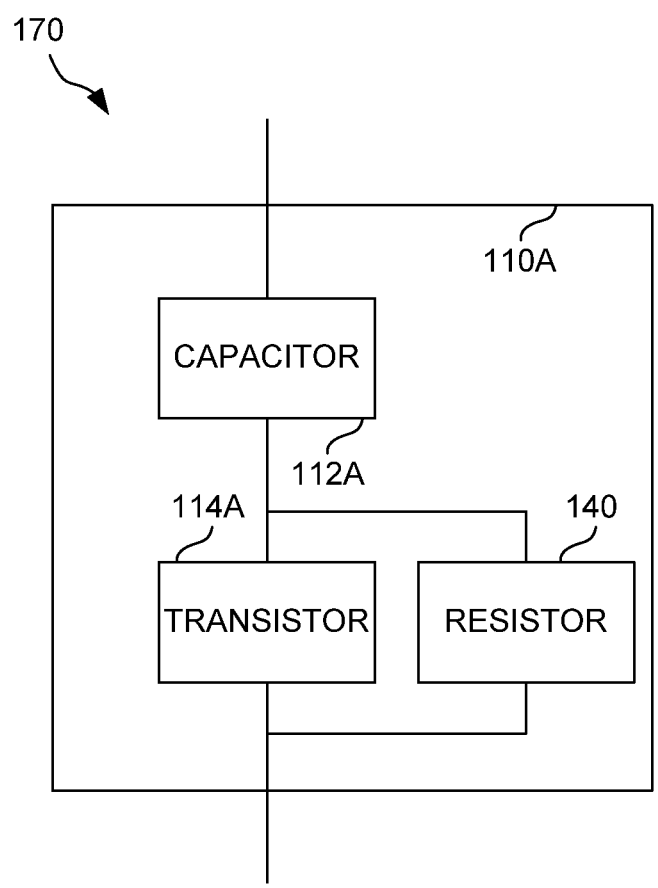
FIG. 1C-1 illustrates a first sub-circuit for reducing a voltage stress on at least a portion of a converter circuit in an event that a power source is improperly coupled, in accordance with an embodiment.

FIG. 1C-1 illustrates a first sub-circuit 110A for reducing a voltage stress on at least a portion of a converter circuit in an event that a power source is improperly coupled, in accordance with an embodiment. As an option, the first sub-circuit 110A may be implemented in the context of any one or more of the embodiments set forth in any previous and/or subsequent figure(s) and/or the description thereof. For example, the first sub-circuit 110A may be implemented in the context of the sub-circuit no of FIG. 1A. However, it is to be appreciated that the first sub-circuit 110A may be implemented in other suitable environments.

As shown, the first sub-circuit 110A includes a capacitor 112A (e.g. the second capacitor 112 of FIG. 1A) serially coupled with an auxiliary transistor 114 that reducing a voltage stress on at least a portion of a converter circuit (e.g. the converter circuit 100 of FIG. 1A) in an event that a power source is improperly coupled. As mentioned earlier, this is accomplished by the auxiliary transistor 114A bearing at least a portion of an improperly-applied voltage. As further shown, the first sub-circuit 110A includes a resistor 140 coupled in parallel with the auxiliary transistor 114A. In such embodiment, such resistor 140, in combination with the auxiliary transistor 114A, may bear an increased portion of the aforementioned improperly-applied voltage, thereby enhancing any protection afforded.

Figures 1, 1C, 2:
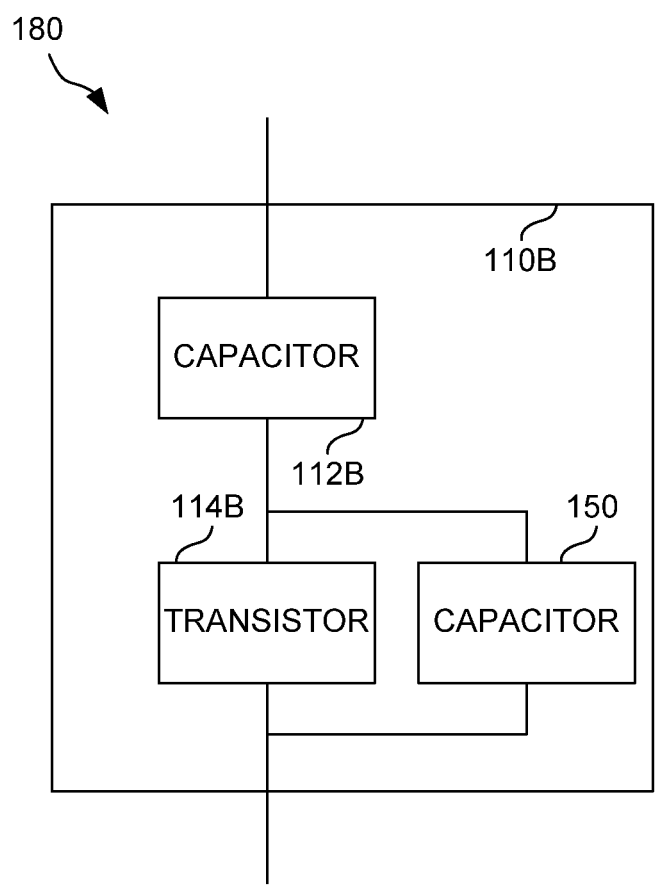
Figure 2:
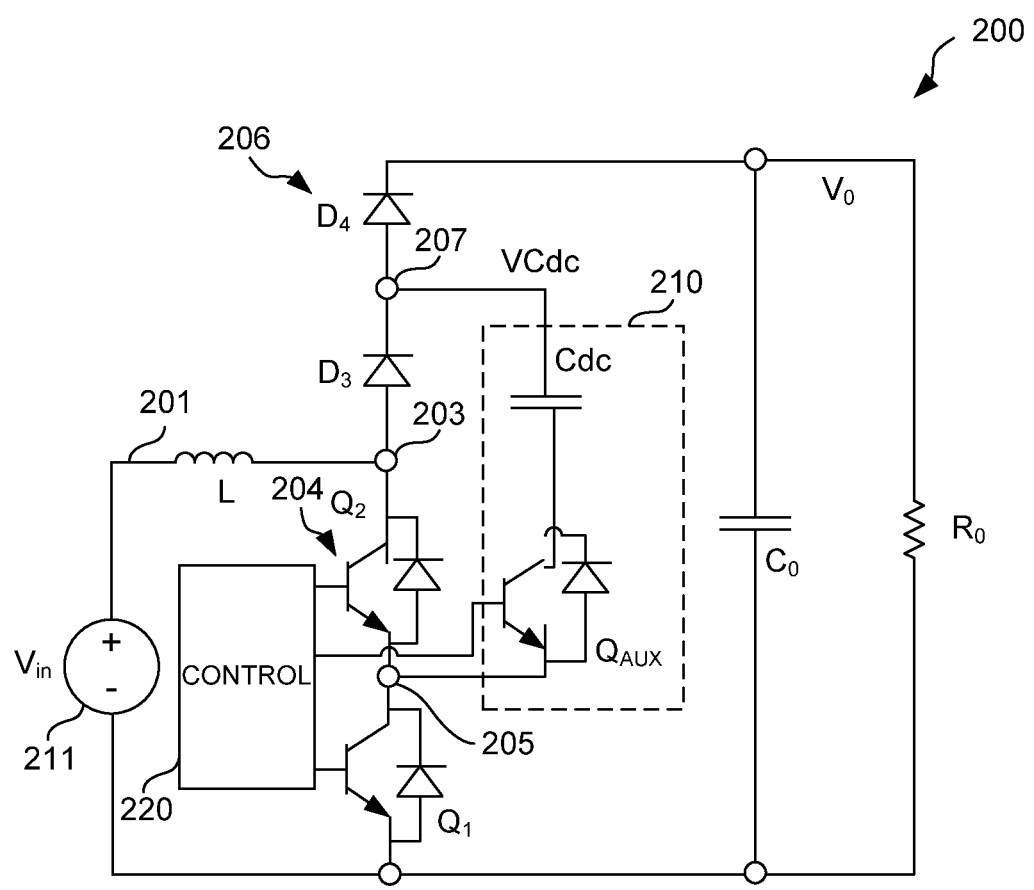

FIG. 1C-2 illustrates a second sub-circuit 110B for reducing a voltage stress on at least a portion of a converter circuit in an event that a power source is improperly coupled, in accordance with an embodiment. As an option, the second sub-circuit 110B may be implemented in the context of any one or more of the embodiments set forth in any previous and/or subsequent figure(s) and/or the description thereof. For example, the second sub-circuit 110B may be implemented in the context of the sub-circuit no of FIG. 1A. However, it is to be appreciated that the second sub-circuit 110B may be implemented in other suitable environments.

As shown, the second sub-circuit 110B includes a capacitor 112B (e.g. the second capacitor 112 of FIG. 1A) serially coupled with an auxiliary transistor 114B that reducing a voltage stress on at least a portion of a converter circuit (e.g. the converter circuit 100 of FIG. 1A) in an event that a power source is improperly coupled. As mentioned earlier, this is accomplished by the auxiliary transistor 114B bearing at least a portion of an improperly-applied voltage. As further shown, the second sub-circuit 110B includes another capacitor 150 coupled in parallel with the auxiliary transistor 114B. In such embodiment, such other capacitor 150, in combination with the auxiliary transistor 114B, may bear an increased portion of the aforementioned improperly-applied voltage, thereby enhancing any protection afforded. In yet another optional embodiment, the other capacitor 150 may be equipped with a parallel-coupled resistor (like that shown in FIG. 1C-1), for further enhancing protection.

FIG. 2 illustrates a converter circuit 200 equipped with an auxiliary transistor for protecting at least a portion of the converter circuit 200 at start up, in accordance with another embodiment. As an option, the converter 200 may be implemented in the context of any one or more of the embodiments set forth in any previous and/or subsequent figure(s) and/or the description thereof. For example, the converter circuit 200 may be implemented in the context of converter circuit 100 of FIG. 1A. However, it is to be appreciated that the converter circuit 200 may be implemented in other suitable environments.

As shown, the converter circuit 200 includes an inductor L including a first terminal 201 configured to be coupled to a power source 211, and a second terminal 203. The converter circuit 200 further includes a pair of serially-coupled transistors (including a first transistor Q1 and a second transistor Q2) coupled to the second terminal 203 of the inductor L. As shown, the pair of serially-coupled transistors Q1, Q2 have a transistor intermediate node 205 therebetween.

As further shown, the serially-coupled transistors Q1, Q2 include NPN IGBT transistors, each equipped with an anti-parallel diode, in the manner shown. Specifically, the first transistor Q1 includes an emitter node coupled to ground and a common node coupled to an emitter node of the second transistor Q2, as shown. Still yet, the second transistor Q2 includes a common node coupled to the second terminal 203 of the inductor L. In other embodiments, different types of transistors and configurations may be employed, as desired. For example, GaN or SiC type transistors may be employed in another embodiment.

By this design, the serially-coupled transistors Q1, Q2 form a multiple-level (multi-level) boost converter circuit. As a result, any voltage stress applied by the power source 211 is shared among the serially-coupled transistors Q1, Q2. Specifically, in the multi-level boost converter embodiment shown, any voltage stress applied by the power source 211 is split (evenly) among the serially-coupled transistors Q1, Q2. Further, due to the multi-level configuration, the inductor L is subjected to a greater switching frequency. In other words, if both transistors Q1, Q2 are switching at X Hz, the inductor L (and other passive components shown) will, due to the configuration, be subjected to 2× Hz. Thus, an amount of voltage (over time) on the inductor L is half (as compared to a single boost design) and, therefore, less current ripple will be present at an output of the inductor L and further a smaller (and thus cheaper) inductor L may be used, in some optional embodiments. It should be noted that, while the converter circuit 200 is shown to comprise two levels, other embodiments are contemplated where a different number of levels (e.g. three, four . . . . N) are implemented.

Further provided is a pair of serially-coupled diodes (including a first diode D3 and a second diode D4) coupled to the second terminal 203 of the inductor L. The pair of serially-coupled diodes have a diode intermediate node 207 therebetween. Specifically, the first diode D3 includes an anode coupled to the second terminal 203 of the inductor L, and a cathode coupled to an anode of the second diode D4. Still yet, a cathode of the second diode D4 is coupled to an output of the converter circuit 200.

Still yet, a first capacitor Co is coupled in parallel with the serially-coupled transistors Q1, Q2 and the serially-coupled diodes D3, D4. In one embodiment, the first capacitor Co may serve as a flying capacitor. In use, the first capacitor Co may thus clamp an output voltage Vo, thereby further limiting an amount of voltage stress that is capable of being applied to the serially-coupled transistors Q1, Q2 and the serially-coupled diodes D3, D4. In one possible embodiment, the size, shape, or other aspect of the first capacitor Co may be configured to clamp a voltage amount of the first capacitor Co to be less than or equal to half of the output voltage Vo (i.e. 0.5*Vo). In various embodiments, this may reduce voltage stress on one or more of the serially-coupled transistors Q1, Q2 and/or serially-coupled diodes D3, D4, as well as permit use of a smaller (and thus cheaper) inductor L. As a further option, such first capacitor Co may also serve to reduce loop inductance (and lower switching loss) which may be beneficial in higher voltage/power/switching-rate applications.

The converter circuit 200 further includes a sub-circuit 210 having a second capacitor Cdc that is serially-coupled with an auxiliary transistor Qaux. As shown, the sub-circuit 210 is coupled between the transistor intermediate node 205 and the diode intermediate node 207. As further shown, the auxiliary transistor Qaux includes a NPN IGBT transistor, equipped with an anti-parallel diode, in the manner shown. In other embodiments, a different type of transistor may be employed, as desired. For example, an ion IGBT transistor or even a MOSFET may be employed in another embodiment.

Still yet, the converter circuit 200 includes a controller 220 coupled to the gates of each of the serially-coupled transistors Q1, Q2 and the auxiliary transistor Qaux for selectively activating the same both at start up and runtime.

During runtime, the auxiliary transistor Qaux remains activated, and the converter circuit 200 alternates between a first state with the first transistor Q1 being activated and the second transistor Q2 being deactivated, and a second state with the first transistor Q1 being deactivated and the second transistor Q2 being activated, with a transitory third state where both of the first transistor Q1 and the second transistor Q2 being deactivated.

In the first state, current flows from the power source 211 and through the first diode D3, the second capacitor Cdc, the auxiliary transistor Qaux, and the first transistor Q1. Further, in the second state, the current flows from the power source 211 and through the second transistor Q2, the auxiliary transistor Qaux, the second capacitor Cdc, and the second diode D4. During the transitory third state, the current flows from the power source 211 and through the first diode D3 and the second diode D4. More information regarding such runtime operation will be set forth during reference to FIGS. 4-5.

Further, at start up, the controller 220 activates the first transistor Q1 and the auxiliary transistor Qaux while deactivating the second transistor Q2, for a predetermined amount of time. By simultaneously activating the first transistor Q1 and the auxiliary transistor Qaux at start up, the auxiliary transistor Qaux is capable of not only charging the first capacitor Cdc, but also protecting the various circuit components in the event of a misapplication of the voltage source 211. This may be accomplished by offloading at least a portion of a voltage stress that may be existent in the event that the power source 211 is misapplied by the polarity thereof being flipped. This is accomplished by permitting current to flow through the auxiliary transistor Qaux of the sub-circuit 210 at start up.

By this design, the converter circuit 200 is configured for activating the auxiliary transistor Qaux at start up for reducing a voltage stress on the first transistor Q1 and the second diode D4. More information regarding the start up and runtime operation of the converter circuit 200 will be set forth during the description of subsequent embodiments.

Figure 3:
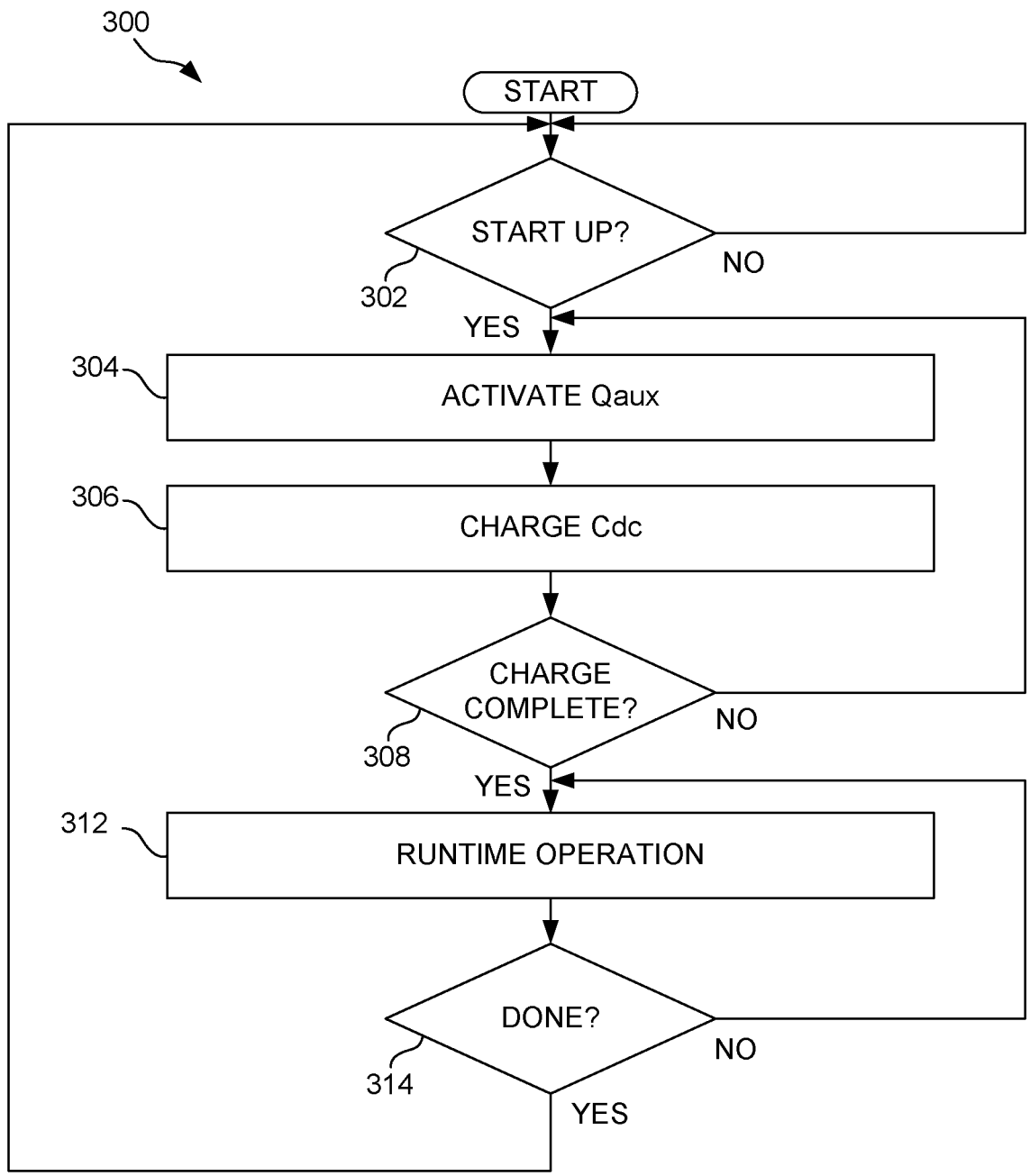
FIG. 3 illustrates a method for protecting at least a portion of a converter circuit at start up, in accordance with an embodiment.

FIG. 3 illustrates a method 300 for protecting at least a portion of a converter circuit at start up, in accordance with an embodiment. As an option, the method 300 may be implemented in the context of any one or more of the embodiments set forth in any previous and/or subsequent figure(s) and/or the description thereof. For example, the method 300 may be carried out in the context of the converter circuit 100 and/or the converter circuit 200 of FIGS. 1A and 2, respectively. However, it is to be appreciated that the method 300 may be implemented in other suitable environments.

As shown, the method 300 begins at start up per decision 302. In the context of the present description, start up may refer to an instantaneous time or time period after power is applied to a converter circuit (e.g. the converter circuit 100 and/or the converter circuit 200 of FIGS. 1A and 2, respectively) and/or after power is applied and further after a controller (e.g. the controller of 220 of FIG. 2) of the converter circuit switches the switching transistors (e.g. the serially-coupled transistors Q1, Q2 of FIG. 2) to their initial startup states.

Once start up is initiated per decision 302, an auxiliary transistor (e.g. the auxiliary transistor Qaux of FIG. 2) is activated in operation 304 by turning the same on. In connection with operation 304, a capacitor (e.g. the capacitor Cdc of FIG. 2) is charged in operation 306, in preparation for runtime operation. While the operation 306 is shown to follow operation 304, it should be noted that, in other embodiments, such operations may be simultaneously initiated in parallel.

With continuing reference to FIG. 3, it is determined in decision 308 whether the charging of the capacitor (see operation 304) is complete. This may be determined, in various embodiments, by sensing a voltage across the capacitor, or simply assuming it is charged after a predetermined amount of charging time has elapsed. If it is not charged, operations 304-306 are repeated, as shown. On the other hand, if it is determined in decision 308 that the charging of the capacitor is complete, runtime operation ensues in operation 312 whereby the serially-coupled transistors are switched on and off 180 degrees out-of-phase during use for charging and discharging an inductor (e.g. the inductor L of FIG. 2) during use. This runtime operation continues until completed per decision 314.

Figure 4:
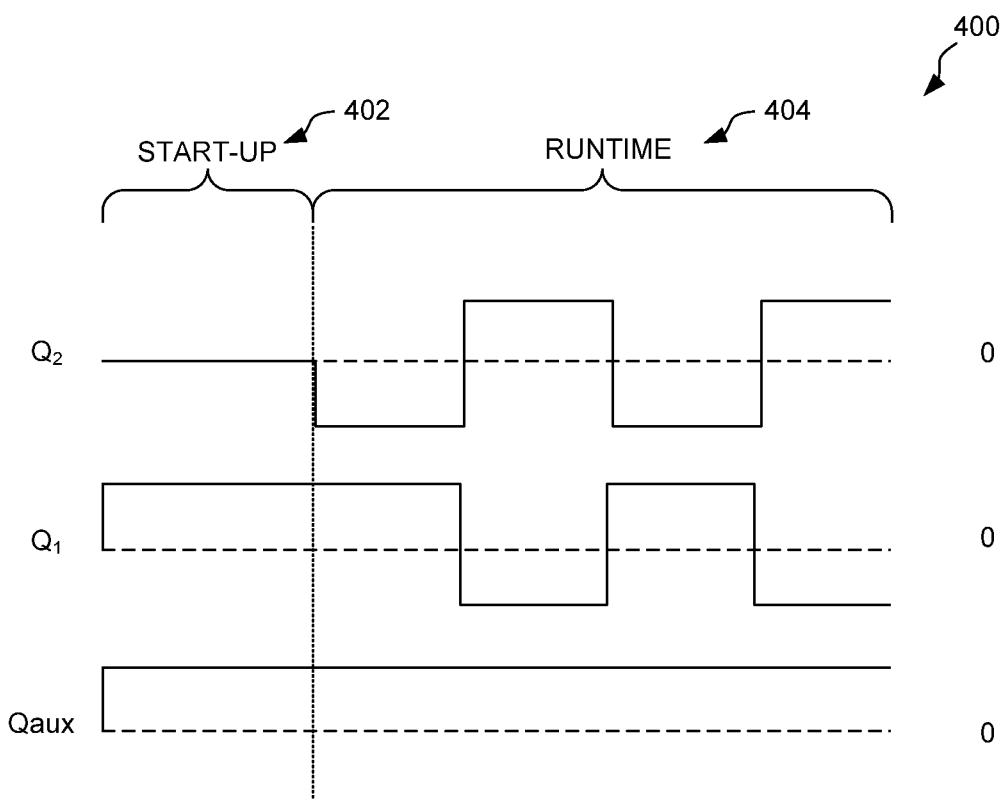
FIG. 4 illustrate a graph illustrating both startup and runtime operation of transistors of a converter circuit, in accordance with an embodiment.
Figure 5:
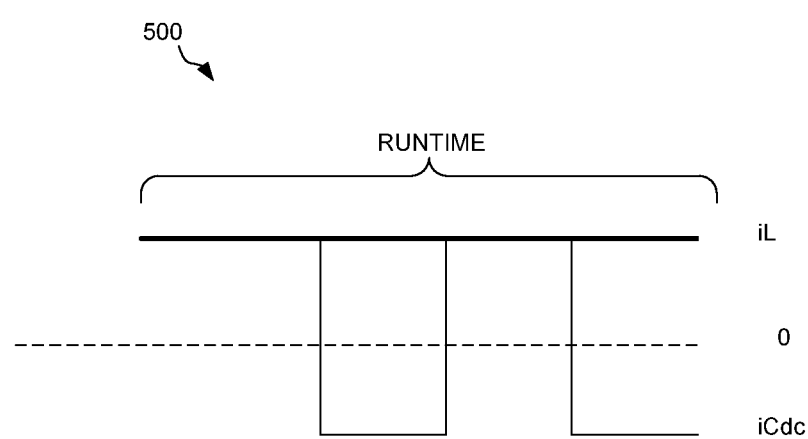
FIG. 5 illustrate another graph illustrating runtime operation of various inductive and capacitive components of a converter circuit, in accordance with an embodiment.

FIGS. 4 and 5 illustrates graphs 400 and 500 illustrating runtime operation of a converter circuit, in accordance with an embodiment. As an option, such runtime operation may be implemented in the context of any one or more of the embodiments set forth in any previous and/or subsequent figure(s) and/or the description thereof. For example, the runtime operation may be carried out in the context of the converter circuit 100 and/or the converter circuit 200 of FIGS. 1A and 2, respectively, and/or the operation 312 of FIG. 3. However, it is to be appreciated that such runtime operation may be implemented in other suitable environments.

As shown in the graph 400 of FIG. 4, control signals are fed, by a controller (e.g. the controller 220 of FIG. 2), to gates/bases of a first transistor Q1 (e.g. the first transistor Q1 of FIG. 2), a second transistor Q2 (e.g. the second transistor Q2 of FIG. 2), and an auxiliary transistor (e.g. the auxiliary transistor Qaux of FIG. 2) for controlling the switching thereof. Specifically, at a startup phase 402, the auxiliary transistor Qaux and the first transistor Q1 are activated, while the second transistor Q2 remains deactivated. During such time, a capacitor (e.g. the first capacitor Cdc) may be charged in preparation for runtime operation.

Further, at a runtime phase 404, the auxiliary transistor Qaux remains activated and the first transistor Q1 and the second transistor Q2 are activated in an alternating manner, as described above. Specifically, the first transistor Q1 is switched in accordance with a first alternating control signal. Further, the second transistor Q2 is switched in accordance with a second alternating control signal. As shown, the first alternating control signal and the second alternating control signal are 180 degrees out of phase.

By including the auxiliary transistor Qaux, any misapplication of voltage at the beginning of the startup phase 402 (before the capacitor is charged) results in the auxiliary transistor Qaux sharing any voltage stress with other active components, thereby avoiding damage.

As shown in the graph 500 of FIG. 5, a capacitor current 502 is shown, during runtime operation, to flow through a capacitor (e.g. the second capacitor Cdc of FIG. 2) of the converter circuit in an alternating manner that coincides with the switching of the first and second transistors Q1, Q2. Further, an indicator current 504 is shown that flows through an inductor (e.g. the inductor L of FIG. 2). At a 0.5 duty cycle, minimal ripple is exhibited in the indicator current 504 which may be desirable in some embodiments.

Figure 6:
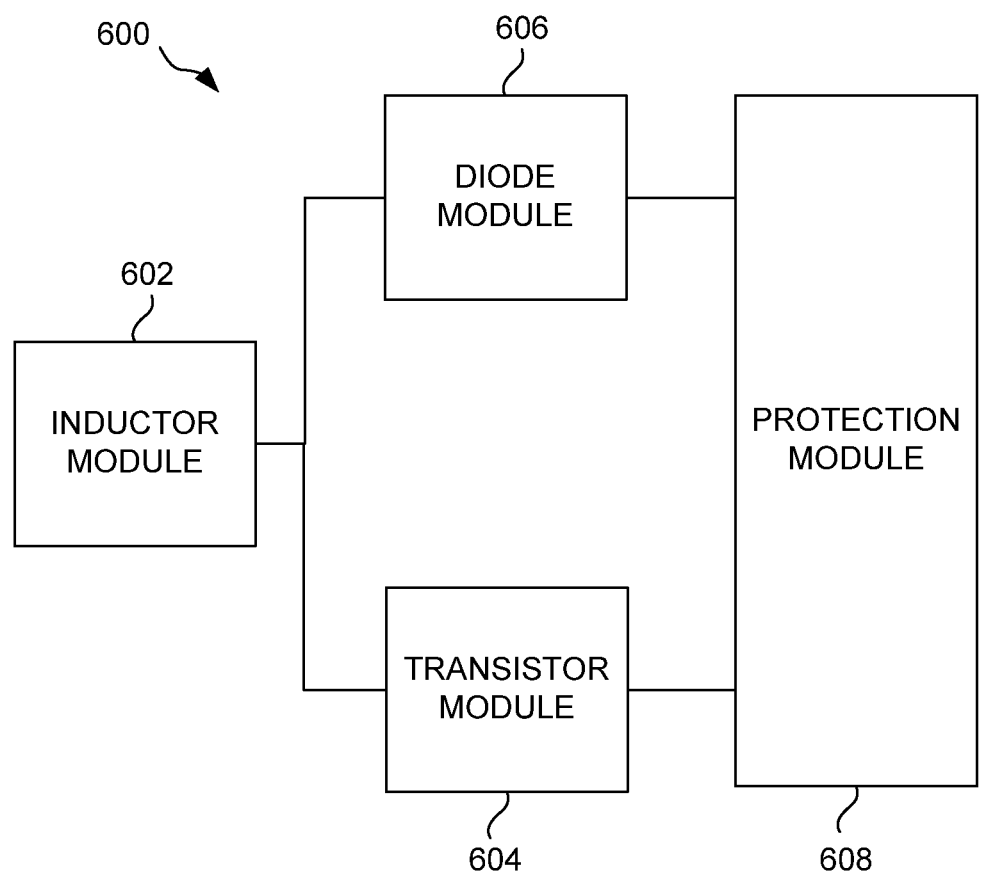
FIG. 6 illustrates a system for reducing a voltage stress on at least a portion of a converter circuit in an event that a power source is improperly coupled, in accordance with an embodiment.

FIG. 6 illustrates a system 600 for reducing a voltage stress on at least a portion of a converter circuit in an event that a power source is improperly coupled, in accordance with an embodiment. As an option, the system 600 may be implemented with one or more features of any one or more of the embodiments set forth in any previous and/or subsequent figure(s) and/or the description thereof. However, it is to be appreciated that the system 600 may be implemented in other suitable environments.

As shown, an inductor means in the form of an inductor module 602 is provided for storing electrical energy in a magnetic field when electric current is applied. In various embodiments, the inductor module 602 may include, but is not limited to the inductors 102 and L of FIGS. 1A-2 and/or any other circuitry capable of the aforementioned functionality.

Also included is a transistor means in the form of a transistor module 604 in communication with the inductor module 602 for switching on and off during runtime operation. In various embodiments, the transistor module 604 may include, but is not limited to the transistors 104A, 104B, Q1, Q2 of FIGS. 1A-2 and/or any other circuitry capable of the aforementioned functionality.

Further included is a diode means in the form of a diode module 606 in communication with the inductor module 602 for allowing current to pass in only a single direction. In various embodiments, the diode module 606 may include, but is not limited to the diodes 106A, 106B, D3, D4 of FIGS. 1A-2 and/or any other circuitry capable of the aforementioned functionality.

With continuing reference to FIG. 6, protection means in the form of a protection module 608 is in communication with the diode module 606 and the transistor module 604 for offloading at least a portion of any voltage stress from the diode module 606 and the transistor module 604, in response to input voltage being misapplied (e.g. due to a polarity mismatch). In various embodiments, the protection module 608 may include, but is not limited to the auxiliary transistors 114, Qaux of FIGS. 1A-2, and/or any other circuitry capable of the aforementioned functionality.

One or more of the foregoing embodiments may thus incorporate an auxiliary transistor that is configured for protecting at least a portion of the converter circuit at start-up. Specifically, in one possible embodiment, such protection may be provided when a power source is improperly applied to the converter circuit. This may occur, for example, when a polarity of the power source is switched. In such case, the auxiliary transistor serves for reducing a voltage stress on at least a portion of the converter circuit which, in turn, reduces a chance that one or more components of the converter circuit is damaged and the converter circuit rendered impaired or inoperable. This may, in turn, result in protection that would otherwise be foregone in systems that lack such componentry and/or functionality. It should be noted that the aforementioned potential advantages are set forth for illustrative purposes only and should not be construed as limiting in any manner.

Figure 7:
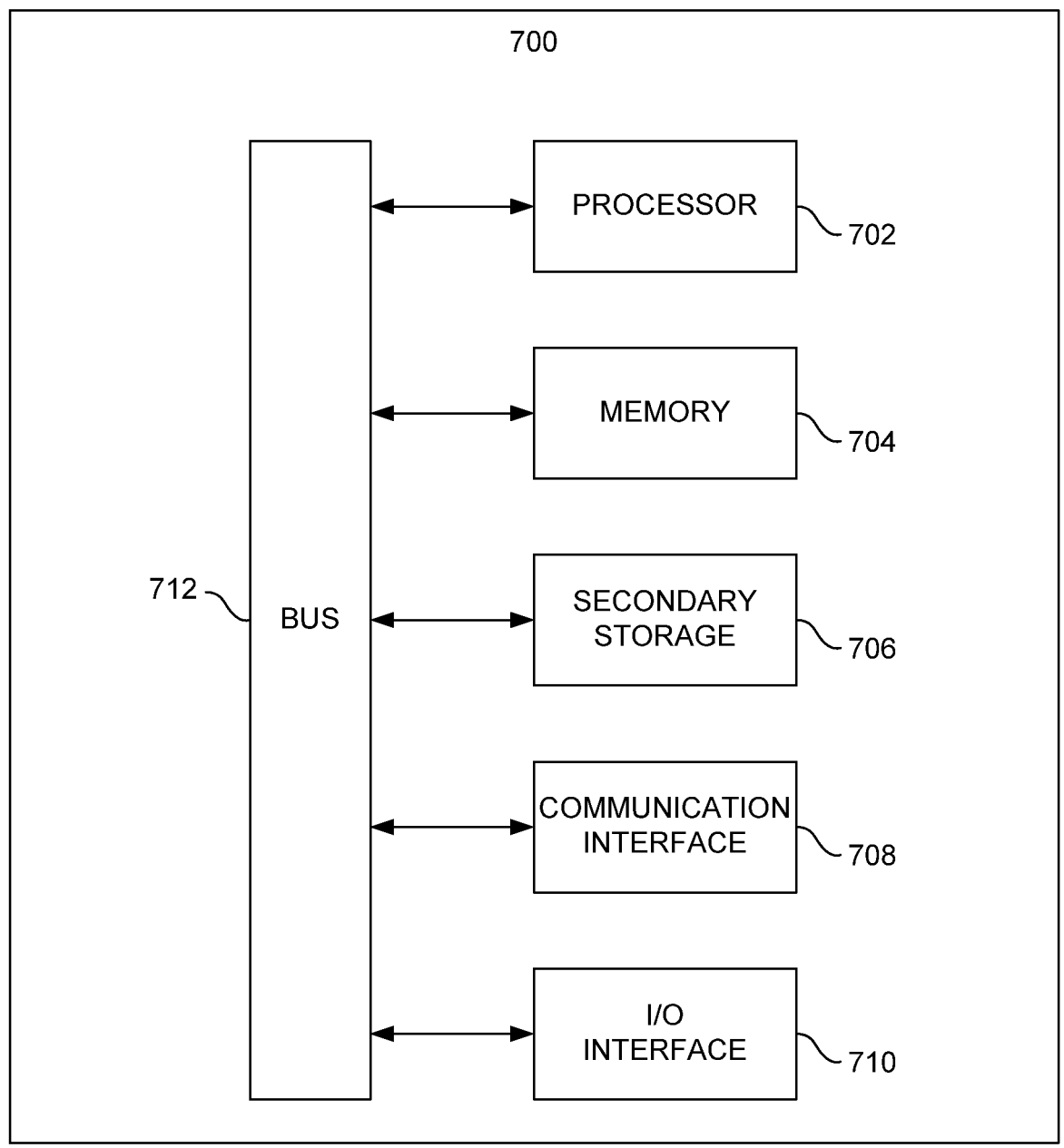
FIG. 7 is a diagram of an exemplary processing device, in accordance with an embodiment.

FIG. 7 is a diagram of an exemplary processing device 700, in accordance with an embodiment. As an option, the processing device 700 may be implemented in the context of the controller 220 of FIG. 2. However, it is to be appreciated that the processing device 700 may be implemented in any desired environment.

As shown, the processing device 700 includes at least one processor 702 which is connected to a bus 712. The processing device 700 also includes memory 704 [e.g., hard disk drive, solid state drive, random access memory (RAM), etc.] coupled to the bus 712. The memory 704 may include one or more memory components, and may even include different types of memory. Further included is a communication interface 708 (e.g. local/remote network interface, memory access interface, etc.) and an input/output (I/O) interface 710 (e.g. display, speaker, microphone, touchscreen, touchpad, mouse interface, etc.).

The processing device 700 may also include a secondary storage 706. The secondary storage 706 coupled to the bus 712 and/or to other components of the processing device 700. The secondary storage 706 can include, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the memory 704, the secondary storage 706, and/or any other memory, for that matter. Such computer programs, when executed, enable the processing device 700 to perform various functions (as set forth above, for example). Memory 704, secondary storage 706 and/or any other storage comprise non-transitory computer-readable media.

In one embodiment, the at least one processor 702 executes instructions in the memory 704 or in the secondary storage 706 to control a converter (e.g. the converter 100 or 200 of FIGS. 1 and 2, respectively). It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), or the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; or the like.

Computer-readable non-transitory media includes all types of computer readable media, including magnetic storage media, optical storage media, and solid state storage media and specifically excludes signals. It should be understood that the software can be installed in and sold with the devices described herein. Alternatively the software can be obtained and loaded into the devices, including obtaining the software via a disc medium or from any manner of network or distribution system, including, for example, from a server owned by the software creator or from a server not owned but used by the software creator. The software can be stored on a server for distribution over the Internet, for example.

It should be understood that the arrangement of components illustrated in the Figures described are exemplary and that other arrangements are possible. It should also be understood that the various system components defined by the claims, described below, and illustrated in the various block diagrams represent logical components in some systems configured according to the subject matter disclosed herein.

For example, one or more of these system components may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A converter comprising:
   an inductor including a first terminal and a second terminal, the first terminal configured to be coupled to a power source;
   a pair of serially-coupled transistors coupled to the second terminal of the inductor, a transistor intermediate node being positioned between the pair of serially-coupled transistors;
   a pair of serially-coupled diodes coupled to the second terminal of the inductor, a diode intermediate node being positioned between the pair of serially-coupled diodes;
   a first capacitor coupled in parallel with the pair of serially-coupled transistors and the pair of serially-coupled diodes; and
   a sub-circuit coupled between the transistor intermediate node and the diode intermediate node, the sub-circuit including a second capacitor serially-coupled with an auxiliary transistor configured to be activated during a start-up phase of the converter to protect against a voltage surge resulting from the power source being improperly coupled to the first terminal of the inductor and reduce voltage stress on at least a portion of the converter,
   wherein the sub-circuit is coupled in parallel with a transistor of the pair of serially-coupled transistors and in parallel with a diode of the pair of serially-coupled diodes.

2. The converter of claim 1, wherein the auxiliary transistor is configured to reduce the voltage stress on at least the pair of serially-coupled transistors.

3. The converter of claim 1, wherein the auxiliary transistor reduces the voltage stress on at least one of the pair of serially-coupled diodes.

4. The converter of claim 1, wherein a voltage capacity of the first capacitor is less than or equal to half an output voltage of the converter.

5. The converter of claim 1, wherein the first capacitor is configured to reduce the voltage stress on at least the portion of the converter.

6. The converter of claim 1, wherein the auxiliary transistor is of a same type as the pair of serially-coupled transistors.

7. The converter of claim 1, wherein the auxiliary transistor is of a different type as compared to the pair of serially-coupled transistors.

8. The converter of claim 1, wherein the sub-circuit further includes a third capacitor coupled in parallel with the auxiliary transistor.

9. The converter of claim 1, wherein the sub-circuit further includes a resistor coupled in parallel with the auxiliary transistor.

10. The converter of claim 1, wherein the auxiliary transistor is an insulated-gate bipolar transistor (IGBT).

11. The converter of claim 1, wherein the auxiliary transistor is a metal oxide semiconductor field effect transistor (MOSFET).

12. A method, comprising:
applying an electric current to a converter circuit, the converter circuit including:
   an inductor including a first terminal and a second terminal, the first terminal configured to be coupled to a power source;
   a pair of serially-coupled transistors coupled to the second terminal of the inductor, a transistor intermediate node being positioned between the pair of serially-coupled transistors;
   a pair of serially-coupled diodes coupled to the second terminal of the inductor, a diode intermediate node being positioned between the pair of serially-coupled diodes;
   a first capacitor coupled in parallel with the pair of serially-coupled transistors and the pair of serially-coupled diodes; and
   a sub-circuit including a second capacitor serially-coupled with an auxiliary transistor configured to reduce voltage stress on at least a portion of the converter circuit, the sub-circuit coupled between the transistor intermediate node and the diode intermediate node and being in parallel with a transistor of the pair of serially-coupled transistors and being in parallel with a diode of the pair of serially-coupled diodes; and
activating the auxiliary transistor during a start-up phase of the converter circuit to protect against a voltage surge resulting from the power source being improperly coupled to the first terminal of the inductor and reduce the voltage stress on at least the portion of the converter circuit.

13. A converter comprising:
an inductor including a first terminal and a second terminal, the first terminal configured to be coupled to a power source;
a pair of serially-coupled transistors coupled to the second terminal of the inductor, a transistor intermediate node being positioned between the pair of serially-coupled transistors;
a pair of serially-coupled diodes coupled to the second terminal of the inductor, a diode intermediate node being positioned between the pair of serially-coupled diodes;
a first capacitor coupled in parallel with the pair of serially-coupled transistors and the pair of serially-coupled diodes; and
a sub-circuit coupled between the transistor intermediate node and the diode intermediate node, the sub-circuit including a second capacitor serially-coupled with an auxiliary transistor, the auxiliary transistor configured to be activated during a start-up phase of the converter to protect against a voltage surge resulting from the power source being improperly coupled to the first terminal of the inductor and reduce a voltage stress on at least the pair of serially-coupled transistors or the pair of serially-coupled diodes,
wherein the sub-circuit is coupled in parallel with a transistor of the pair of serially-coupled transistors and in parallel with a diode of the pair of serially-coupled diodes.

14. The converter of claim 13, wherein the auxiliary transistor is configured to reduce the voltage stress on at least the pair of serially-coupled transistors.

15. The converter of claim 13, wherein the auxiliary transistor is configured to reduce the voltage stress on at least the pair of serially-coupled diodes.

16. The converter of claim 13, wherein the auxiliary transistor is an insulated-gate bipolar transistor (IGBT).

17. The converter of claim 13, wherein the auxiliary transistor is a metal oxide semiconductor field effect transistor (MOSFET).

* * * * *